United States Patent [19]
Madigan et al.

[11] 3,728,025
[45] Apr. 17, 1973

[54] OPTICAL DISTANCE MEASURING EQUIPMENT

[75] Inventors: Thomas S. Madigan, San Diego; Richard F. Stone; David C. Dunn, both of Escondido; William F. Holzer; Robert H. Sweet, both of San Diego, all of Calif.

[73] Assignee: Cubic Corporation, San Diego, Calif.

[22] Filed: Mar. 8, 1971

[21] Appl. No.: 121,794

[52] U.S. Cl. ............................356/5, 356/4, 343/14, 343/5 DP, 250/217 SS
[51] Int. Cl. ..................................................G01c 3/08
[58] Field of Search .........................356/4, 5; 343/14, 343/7.5, 5 DP; 350/96 T; 250/217 SS; 313/108 D

[56] References Cited

UNITED STATES PATENTS

| | | | |
|---|---|---|---|
| 3,547,539 | 12/1970 | Froome et al. | 343/14 |
| 3,619,058 | 11/1971 | Hewlett et al. | 250/204 |
| 3,199,104 | 8/1965 | Miller | 343/5 DP |
| 3,428,815 | 2/1969 | Thompson | 356/5 |
| 2,929,922 | 3/1960 | Schowlow et al. | 330/4.3 |
| 3,652,161 | 3/1972 | Ross | 356/5 |

OTHER PUBLICATIONS

Chen et al., Applied Optics, Vol. 2, No. 3, 3-1963, 350-97.T pp. 265-271.

*Primary Examiner*—Benjamin A. Borchelt
*Assistant Examiner*—S. C. Buczinski
*Attorney*—Carl R. Brown and Neil F. Martin

[57] ABSTRACT

Distance measuring equipment that utilizes a light beam that is intensity modulated by a carrier frequency which is frequency modulated by subcarrier frequencies to provide accurate fine, medium, and coarse distance measurements by detecting the phase shift of these carrier and subcarrier frequencies as a function of distance, and which system includes a cross coupling light transmission means for removing internal delay phase shift error, and that employs a light attenuating device to equalize the intensity of the cross coupling illumination with the return illumination received, and that employs a light transmitter having a substantially planar light source.

20 Claims, 17 Drawing Figures

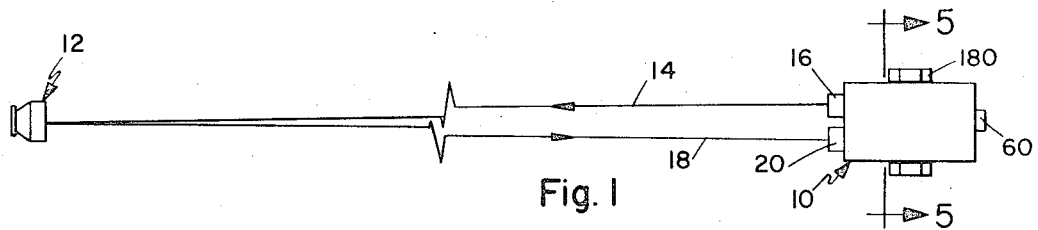
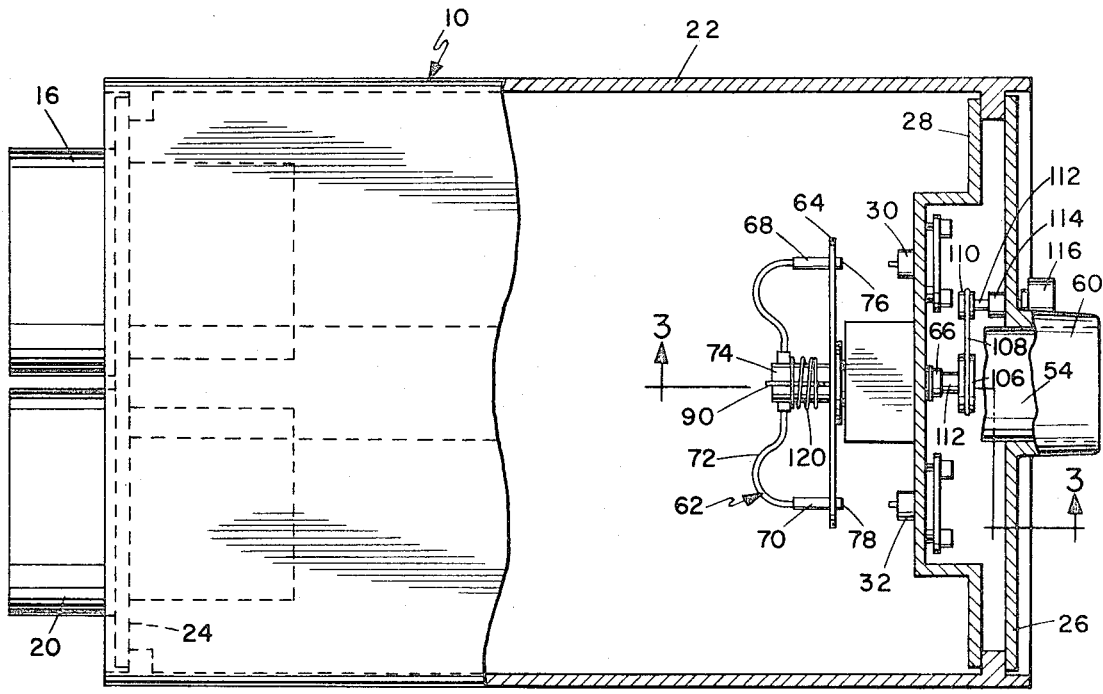
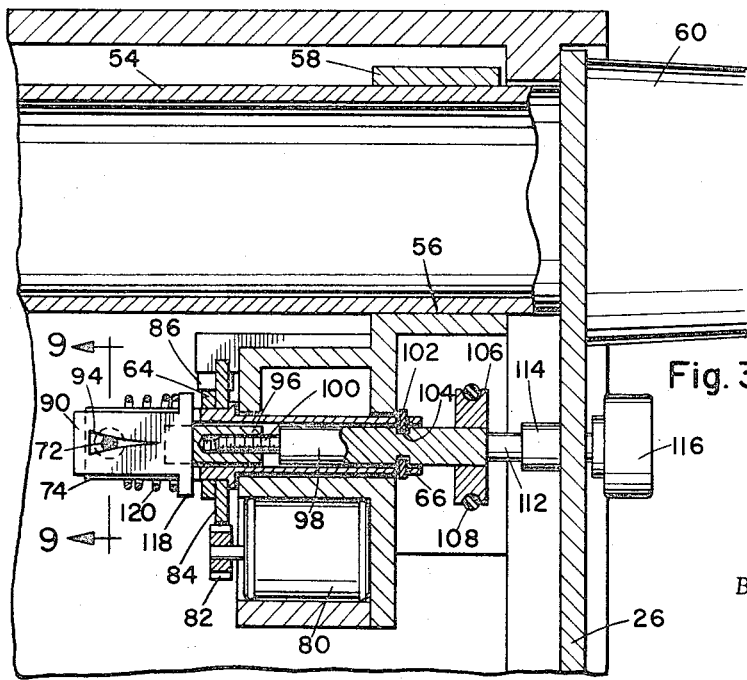
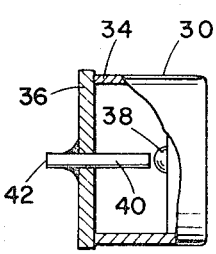
INVENTORS
THOMAS S. MADIGAN
RICHARD F. STONE
DAVID C. DUNN
WILLIAM F. HOLZER
ROBERT H. SWEET
BY Brown & Martin
ATTORNEYS INVENTORS
THOMAS S. MADIGAN
RICHARD F. STONE
DAVID C. DUNN
WILLIAM F. HOLZER
ROBERT H. SWEET BY Brown & Martin

ATTORNEYS

PATENTED APR 17 1973 3,728,025

INVENTORS
THOMAS S. MADIGAN
RICHARD F. STONE
DAVID C. DUNN
WILLIAM F. HOLZER
ROBERT H. SWEET

BY
Brown & Martin
ATTORNEYS

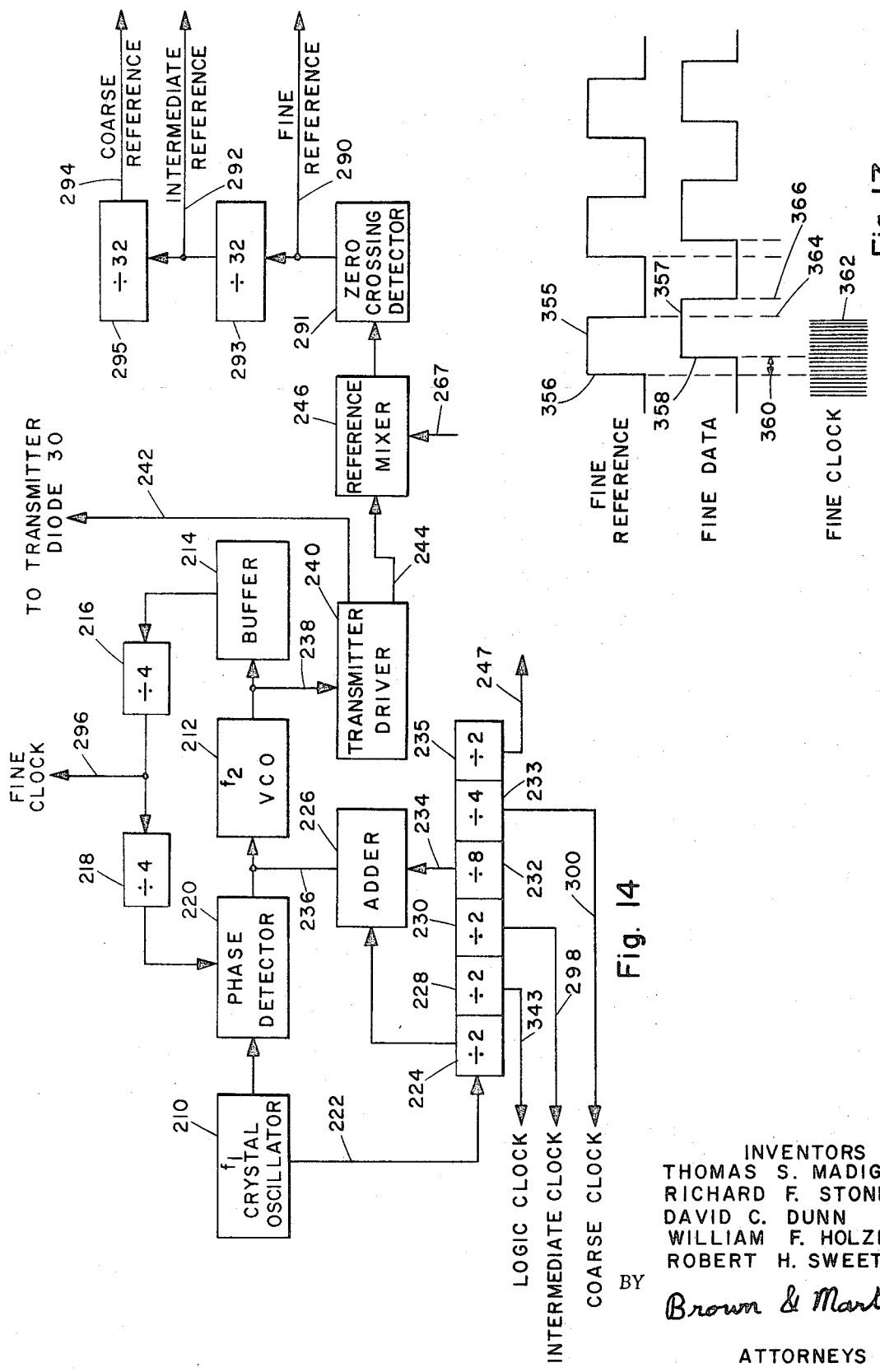

3,728,025

OPTICAL DISTANCE MEASURING EQUIPMENT

BACKGROUND OF THE INVENTION

Optical distance measuring equipment have been known and used for years. These equipments usually transmit light to the reflecting surface of a distant object, receive the reflected light and then determine the distance to the distant object from the phase shift of signals modulated on the light signal transmitted and received. These equipments have varying accuracies that depend upon many factors, such as the accuracy of the entire system, phase shift delays in the equipment, the consistency of the frequency and amplitude output of the transmitting and receiving devices, and many other factors. Yet these devices have many applications and have achieved wide spread use. Thus it is advantageous to have a new and improved optical distance measuring equipment that is capable of providing more accurate distance readings in a relatively quick, efficient and inexpensive manner.

SUMMARY OF THE INVENTION

In an embodiment of the optical distance measuring equipment of this invention, a light beam that may for example be in the infrared band, is transmitted to a reflector at a distant location, which reflector reflects the light back to a receiver. The light source of the light beam is intensity modulated by a carrier frequency signal that is in turn modulated by subcarrier signals, preferably two signals. The phase in these three signals are detected by cross coupling the signals from the transmitter to the receiver. These signals are so spaced in frequency range that a digital processing circuit provides course, intermediate and fine distance measurements for improved distance measuring accuracies. The plurality of distance measurements are averaged over a given number of samples, are totalized and compared by digital means and then are decoded from binary to binary code decimal output to provide a distance display in decimal numbers. The digital sampling and totalizing means provides relative range brackets that are within the capability of such a system. A single oscillator, provides the frequency for the entire system reducing oscillator drift error.

There is usually an internal delay phase shift between the transmitter and the receiver that reduces the overall accuracy of the phase shift distance measurement. This invention provides means for removing this internal delay phase shift through utilization of a direct cross coupled light transmitting means. Since this cross coupled light transmitting means is capable of directing a given intensity of light from the transmitter to the receiver, that exceeds the intensity of the reflected light from a distant reflective object, means are provided for attenuating the light transmitted through the cross coupling device.

In many optical distance measuring equipments, as in the embodiment of this invention, a light emitting diode is employed as the light generating means. Thus generated light is projected through a suitable lens to a distant reflector and returned to the receiver. The receiver thus views a particular minute portion of the light received that is transmitted from a minute area of the light emitting diode. Since given minute areas of a photodiode may generate light of varying intensities and phase, this can provide an error in the phase shift of the modulating signals that are transmitted and received. Thus in this invention means are provided that transform the light emitting diode light source into a substantially planar light source.

It is therefore an object of this invention to provide new and improved optical distance measuring equipment.

It is another object of this invention to provide new and improved optical distance measuring equipment that provides a more accurate measurement of the distance to a reflective object.

It is another object of this invention to provide new and improved optical distance measuring equipment that averages a plurality of phase shift measurement samples to provide a more accurate distance measurement.

It is another object of this invention to provide new and improved optical distance measuring equipment wherein a plurality of signals are imposed upon the transmitted light signal, which signals have different frequencies to provide coarse, medium and fine distance determinations.

It is another object of this invention to provide new and improved optical distance measuring equipment that has means for removing internal delay phase shift from the distance measurement reading.

It is another object of this invention to provide new and improved optical distance measuring equipment having a cross coupled light transmission path for use in determining internal delay phase shift error, which light transmission path adjusts the intensity of the cross coupled light to even the intensity of the cross coupled light with the intensity of the light received from a distance reflective object.

It is another object of this invention to provide new and improved optical distance measuring equipment that provides transmitting light with a substantially planar light source.

It is another object of this invention to provide new and improved optical distance measuring equipment that utilizes a reflecting device capable of positioning reflectors at various angles to vertical while maintaining an exact centered light reflecting point over a given distance measuring location.

Other objects and many other advantages of this invention will become more apparent upon a reading of the following detailed description and an examination of the drawings, wherein like reference numerals designate like parts throughout and in which:

FIG. 1 is a diagram showing the measuring unit and reflector in use.

FIG. 2 is a top plan view of the measuring unit, partly cut away.

FIG. 3 is an enlarged sectional view taken on line 3—3 of FIG. 2.

FIG. 4 is an enlarged view of a light emitting diode, partly cut away.

FIG. 14 is a block diagram of the transmitter circuitry.

FIG. 17 is a diagram showing phase shift determination.

DESCRIPTION OF THE PREFERRED EMBODIMENTS

Figure 5:
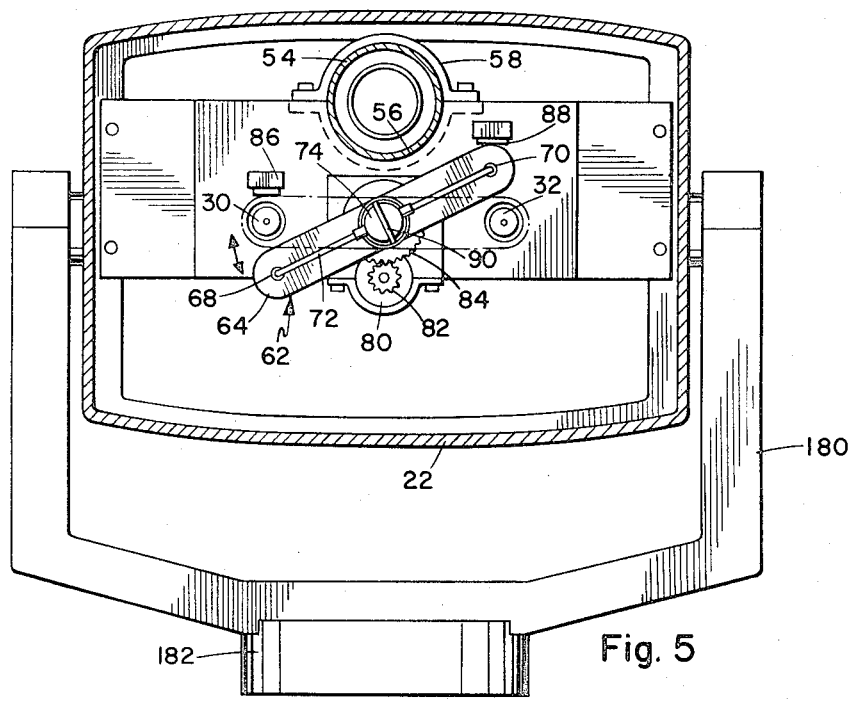
FIG. 5 is an enlarged sectional view taken on line 5—5 of FIG. 1.
Figure 6:
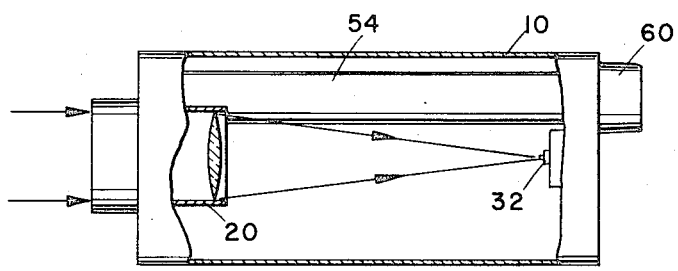
FIG. 6 is a substantially diagrammatic side view of the measuring unit, showing the optical arrangement.

The apparatus comprises a measuring unit 10 and a reflector unit 12, which are set up at the locations between which the distance is to be measured. As shown in FIG. 1, a beam of light 14 is emitted from the transmitting lens 16 and the reflected beam 18 is returned to the receiving lens 20. The character of the light beam and the processing involved in determining distance are described in conjunction with the circuitry.

The measuring unit is self-contained in a casing 22 having a front panel 24 in which lenses 16 and 20 are mounted, and a back panel 26 on which the controls are mounted. Any suitable portion of the casing may be made removable for access to the components. The lenses are conventional and are designed to focus the image of a light source at infinity, but adjustment may be provided for in any suitable manner. Adjacent the rear of casing 22 is a bracket 28 which supports an optical transmitter 30 and an optical receiver 32 in axial alignment with lenses 16 and 20, respectively. The optical transmitter 30 is a light emitting diode, and receiver 32 is a light sensitive diode, both types being available in various forms and mountings. A typical arrangement is illustrated in FIG. 4, in which the transmitting diode is contained in a small can 34 closed by a cover plate 36. The light emitting element 38 is in the center. Since the light from such an element will reach the focal plane of the associated lens with a slight phase deviation across the effective disc of light, it is desirable to produce a light source with an effectively flat disc of small size to facilitate collimation. This is accomplished by mounting a small glass rod 40 in cover plate 36 in axial optical alignment with the element 38, the light being conducted and integrated through the rod to the end face 42, which becomes the planar light source.

Figure 7:
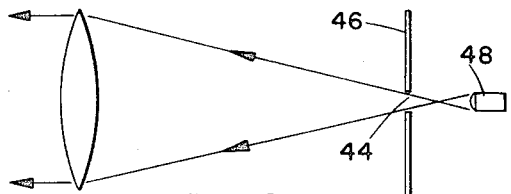
FIG. 7 is a diagram of an alternative means for integrating the light from the transmitting diode.
Figure 8:
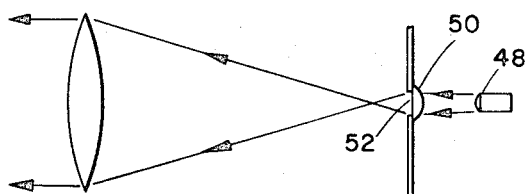
FIG. 8 is a diagram of a further light integrating means.
Figure 9:
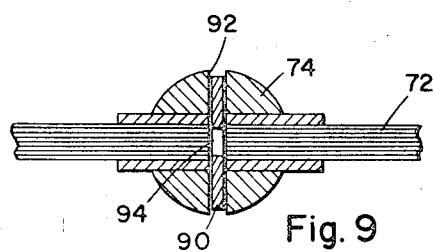
FIG. 9 is an enlarged sectional view taken on line 9—9 of FIG. 3.

For some uses the light can be integrated by means of a pin hole 44 in a baffle 46, as in FIG. 7, so that the light from the emitting element 48 is essentially in a flat front at the plane of the baffle. Another alternative shown in FIG. 8, uses a field lens 50 to integrate the light at an aperture 52.

Alignment of the measuring unit is made by means of a sighting telescope 54 held in a socket 56 on top of bracket 28 and secured by a saddle clamp 58. The eyepiece end of telescope 54 fits into an eyepiece holder 60 on back plate 26, and the objective end protrudes through front plate 24 above and between the lenses.

Mounted on bracket 28 is a calibrating coupler 62, which couples the transmitting and receiving diodes optically at selected times. The coupler includes an arm 64 mounted for rocking motion on a hollow shaft 66, which is rotatable in the bracket on an axis between and parallel to the optical axes of the diodes. Fixed in opposite ends of arm 64 are terminal sleeves 68 and 70 which hold the ends of an optical fiber link 72, the link passing through a cylindrical head 74 on shaft 66. In the calibrating position, the sleeve 68 holds the pick-up end 76 of link 72 in front of transmitting diode 30, and sleeve 70 holds the emitting end 78 of the link in front of receiving diode 32. The arm 64 is driven by a motor 80 fixed on bracket 28 and having a drive pinion 82 engaging a gear 84, which is fixed to the arm. Motion of the arm 64 is limited by bumpers 86 and 88 on bracket 28, which hold the arm respectively in a calibrating position shown in broken line in FIG. 5, and a clear position shown in full line. In the clear position, the diodes are unobstructed.

To attenuate the light intensity through the short link, the link 72 is interrupted in the head 74 by a baffle 90, which slides axially in a slot 92. Baffle 90 has a slot 94 which is tapered, preferably with a longrithmic taper, to vary the exposed area of the opposed ends of the interrupted link, as in FIG. 3. It should be noted that the size of the slot 94 is exaggerated for purposes of illustration, the actual width varying from essentially the full width of the link 72 to almost zero at the narrow end. Due to the inherent losses in the fiber link and the aperture created by slot 94, the light through the link can be matched to the light returning from the reflector. This avoids any changes in intensity between measuring and calibrating positions of the system. The baffle 90 is fixed in a cylindrical plug 96 which slides in hollow shaft 66. An adjustment 98, rotatable in shaft 66, has a threaded end 100 which is screwed into plug 96, the adjustment shaft being held against axial movement by a clip 102 riding in a groove 104. Fixed on shaft 98 is a pulley 106, connected by a belt 108 to a pulley 110 on an actuating shaft 112. The actuating shaft extends through a bearing 114 in back plate 26 and has a knob 116 for manual operation. This arrangement provides a very fine adjustment for attenuation of the light, and the belt drive allows for slippage at the limits of travel. The baffle 90 has lugs 118 which project from head 74 and are engaged by spring 120 which biases the baffle to the open position and prevents backlash in the drive.

Figure 13:
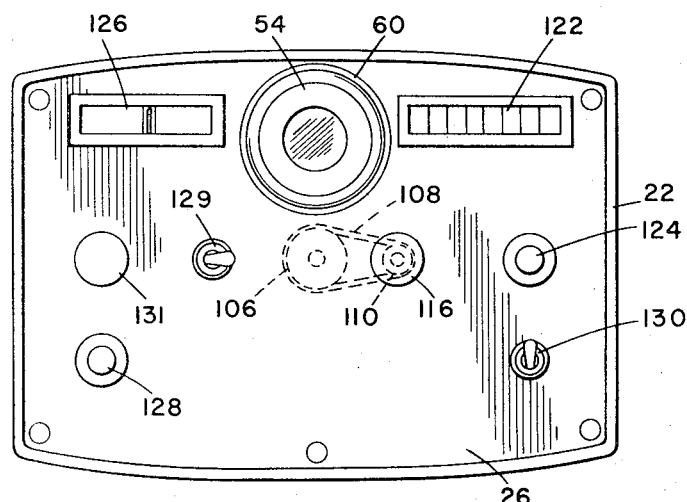
FIG. 13 is a view of the rear control panel of the measuring unit.

For convenience the various controls are on back panel 26, a typical arrangement being shown in FIG. 13. In one upper corner is a distance indicator 122, below which is a push button 124 for initiating a measurement sequence. In the other upper corner is a dual purpose meter 126, one function being to indicate battery condition when a battery test button 128 is pushed. The other function is to calibrate the level of reflected light to the reference light through the coupler 62. Another function is to aid in pointing the instrument for maximum returned signal. By means of a selector switch 129, the level of reflected light from the reflector unit can be read on meter 126 and the indicator adjusted to a center or zero condition by a trim control 131, such as a potentiometer. In the other position of selector switch 129, the motor 80 is actuated to move the coupler 62 to the calibrating position, so that the level of the light through the coupling link is registered on the meter. Knob 116 is then turned to actuate the attenuating baffle 90 and balance the light to the zero position. With the light levels thus calibrated, the unit is set for making a distance measurement.

Figure 10:
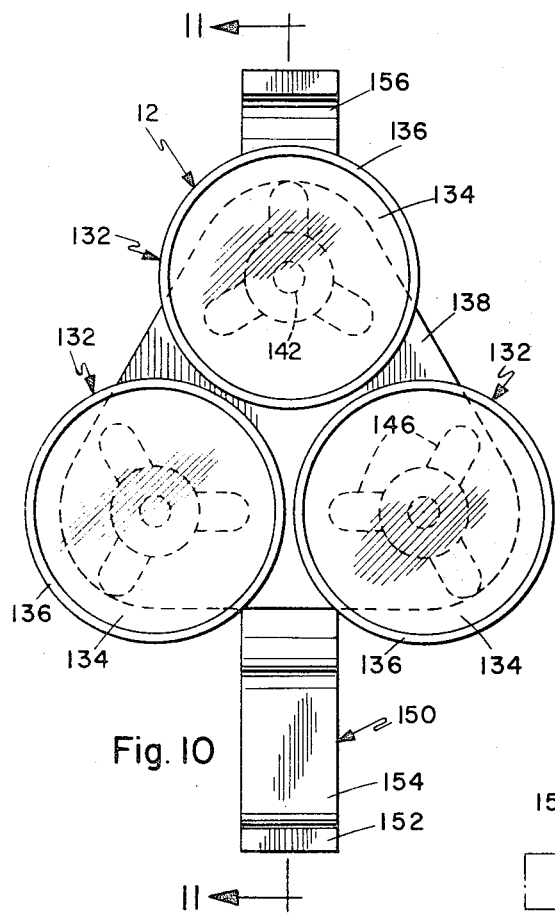
FIG. 10 is a front elevation view of a typical reflector unit.
Figure 11:
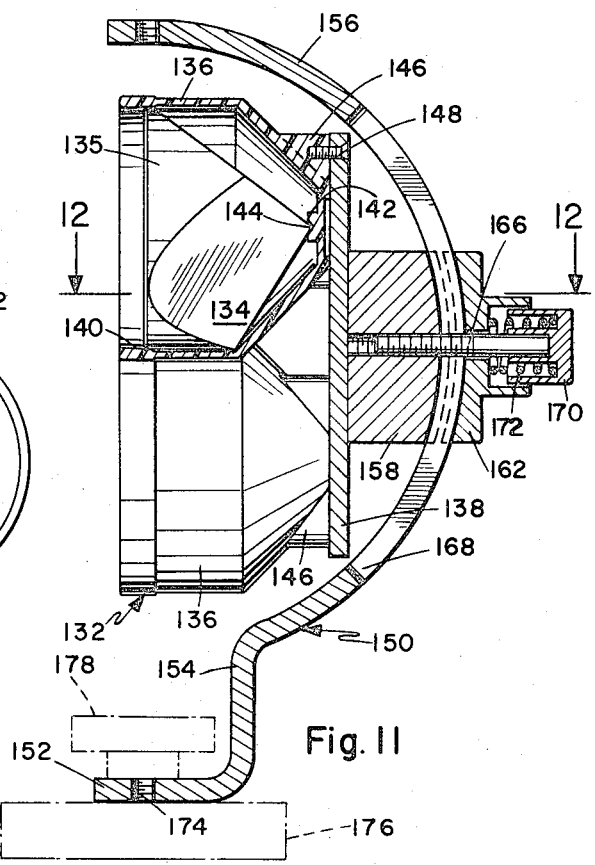
FIG. 11 is a sectional view taken on line 11—11 of FIG. 10.
Figure 12:
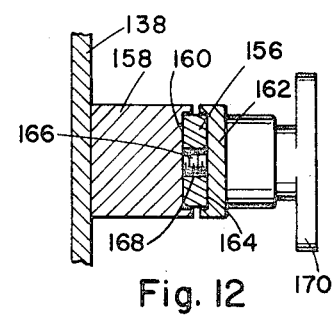
FIG. 12 is a sectional view taken on line 12—12 of FIG. 11.

The reflector unit 12, shown in detail in FIGS. 10 through 12, may be set up with any suitable number of reflector elements 132, three being shown as an example. Each reflector element 132 comprises a special prism 134 secured in a holder 136, the holders being fixed in a group on a mounting plate 138. The prism is a totally internal reflecting type known as a corner cube reflector, which reflects light precisely back to the source, the configuration being well known. To facilitate mounting, the front portion 135 of the prism 134 is made cylindrical to fit into the cup-like holder 136. The inside face 140 of the front opening of holder 136 is slightly divergent inwardly, so that the prism must be forced into place and snaps past the front edge of the holder to be held securely. A recessed socket 142 in the rear of the holder cavity receives the apex 144 of the prism and centers the prism in optical alignment. Each holder 136 has feet 146 which are secured to mounting plate 138 by screws 148.

To provide for accurate alignment with the measuring unit, the reflector assembly is adjustably mounted on a bracket 150, having a base 152, an upright post portion 154 and an upwardly extending arcuate arm 156. The mounting plate 138 is attached to a support block 158, which has an convex arcuate channel 160 to slide on the inside of arm 156. The assembly is held in place by a clamp block 162, having a concave arcuate channel 164 to slide on the outside of arm 156, the clamp block being clamped by a screw 166 which threads into support block 158 through a slot 168 extending longitudinally along the arm. Screw 166 has an enlarged head 170 for manual operation, and clamping pressure is applied by a spring 172 between the head and clamp block 162. Base 152 has a threaded hole 174 to permit attachment of the bracket to a standard tripod, or for securement to a support member 176 by a retaining screw 178, both indicated in broken line in FIG. 11.

For alignment purposes, the measuring unit is preferably mounted in a yoke 180, with a base portion 182 for attachment to a tripod, or to a precision alignment device such as a surveyor's transit mounting. This facilitates careful aiming of the measuring unit at the reflector, using the sighting telescope. Equally precise alignment of the reflector unit with the measuring unit is not critical, since the corner reflectors will return off-axis beams to their source over a reasonable angular deviation.

Figure 15:
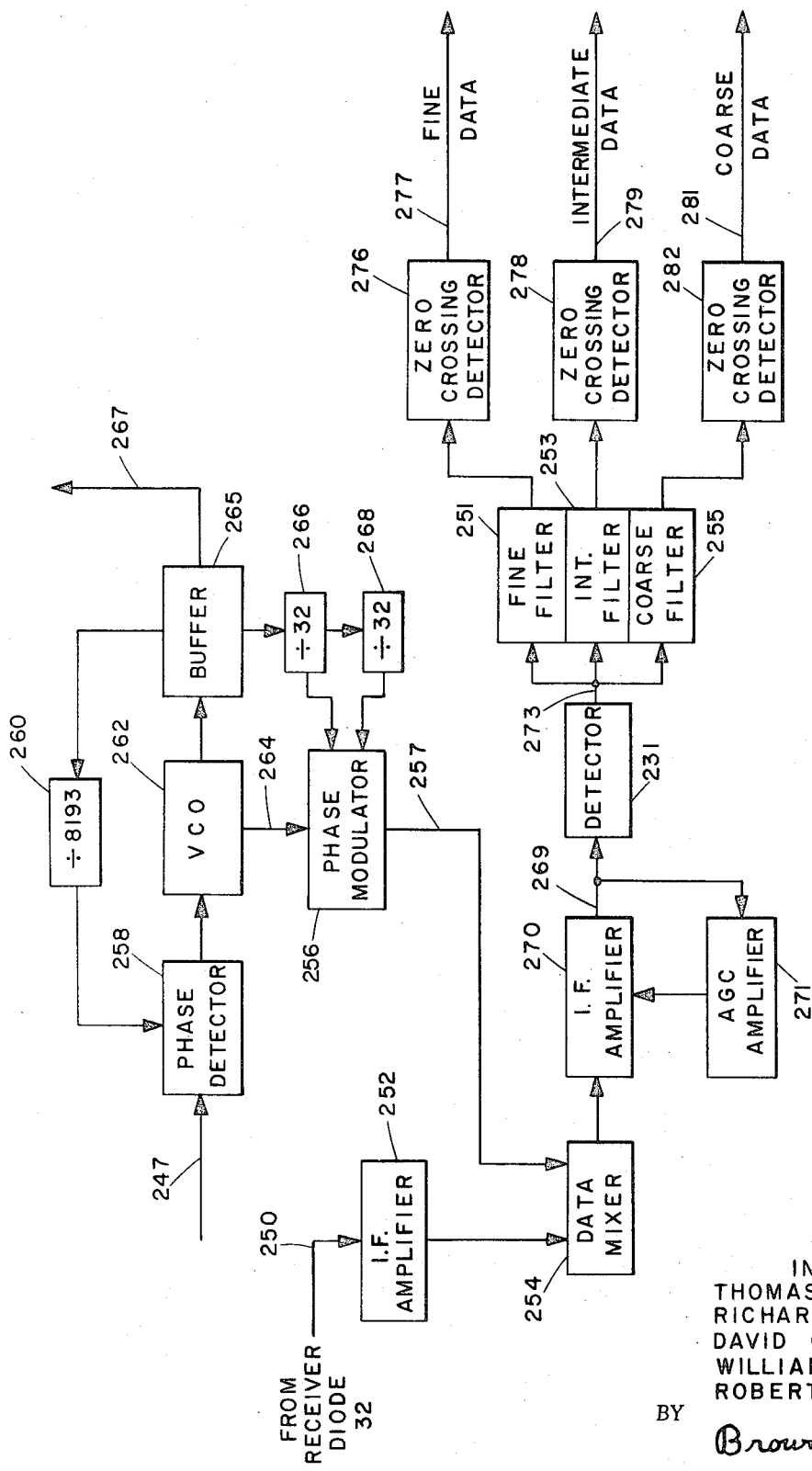
FIG. 15 is a block diagram of the receiver circuitry.

The electronic circuit illustrated in FIGS. 14 and 15 provides the signals for driving the respective transmitter and receiver diodes. Crystal oscillator 210 is a temperature compensated crystal oscillator that supplies an output signal with a frequency $f1$, that for purposes of illustrating a specific embodiment of this invention can be 4. 573198 MHz. This output signal $f1$ is fed to phase detector 220 that provides an error signal output to drive the voltage controlled oscillator 212 at a frequency of 73. 17165 MHz or frequency $f2$. Signal $f2$ is fed to buffer 214 that raises the level of the signal to drive the subsequent logic circuit. The $f2$ output of buffer 214 is fed to frequency divider 216 that divides the frequency by four, which signal is fed to the frequency divider 218 that also divides the frequency by four, which reduces the frequency $f2$ to that of frequency $f1$ or 4. 573198 MHz. The phase detector 220 detects errors in phase between $f2$ divided by 16 and $f1$. Any phase difference between these signals provides an error voltage to the voltage controlled oscillator 212 that corrects its frequency and phase to phase lock frequency $f2$ and its phase to the frequency $f1$ and its phase of the crystal oscillator 210.

Crystal oscillator 210 also supplies signal frequency $f1$ through line 222 to the series of frequency dividers 224, 228, 230, 232, 233 and 235. The first stage frequency divider 224 divides frequency $f1$ by two to a frequency of for example in this description, 2. 286599 MHz and feeds this signal to adder 226. Frequency dividers 224, 228, 230, and 232 divide frequency $f1$ to a frequency of 71. 456215 KHz that is fed through line 234 to the adder 226. Thus the signal at 234 is $f1$ divided by 64.

The output frequency $f2$ of VCO 212 provides the fine range signal frequency that is 16 times $f1$ and divider 224 provides an intermediate range signal frequency that is $f1$ over two and divider 232 provides a coarse range signal frequency of $f1$ over 64. The intermediate frequency and coarse frequency are linearly added in adder 226 and are fed through line 236 to frequency modulate the voltage controlled oscillator 212. This frequency modulates the $f2$ output signal that is fed through line 238 to the transmitter driver circuit 240. Transmitter driver 240 is a power amplifier that supplies an output signal through line 242 to drive the transmitter diode light source or transmitting diode 30, see FIG. 2. The signal causes the light emitting diode to emit a light, which in this embodiment is the infrared band, however it should be understood that any kind of light source that can be so energized and controlled may be used. The signal through line 242, intensity modulates the light source by the $f2$ or 73. 171165 MHz carrier that is in turn frequency modulated by the intermediate frequency and coarse frequency of the adder signal from line 236.

This transmitted light 14, see FIG. 1, is transmitted through the transmitting lens in the manner previously described and is received through the receiving lens 20 and the receiving diode 32. The receiving diode may be any suitable photo detector or other similar device capable of detecting the intensity modulation of the transmitted signal with the phase shift resulting from the distance moved to and from the reflector unit 12.

The receiving diode 32 detects the intensity variation of the return light source modulated signal and provides an output signal that is fed through line 250, see FIG. 15, to IF amplifier 252, which intermediate frequency amplifier has a band pass effect of amplifying and passing a 73 MHz carrier that is frequency modulated by sub-carrier frequencies. The output of the IF amplifier 252 is fed to the data mixer 254.

The frequency dividers 224, 228, 230, 232, 233 and 235 divide the input frequency $f1$ from line 222 to provide an output signal through line 247 to the phase detector 258 of 8.932 KHz that is the frequency $f1$ divided by 512. The phase detector 258 provides an error signal to the voltage controlled oscillator 262, which voltage controlled oscillator provides an output signal of 73.180097 MHz. The output of the VCO 262 is fed through the buffer 265 and through divider 260 that divides the frequency down to the frequency of the input signal to the phase detector 258, forming a second phase and frequency lock loop that holds the frequency and phase of the output signal of the VCO 262 to the same frequency and phase of the output signal $f1$ from the crystal oscillator 210. The phase lock of the phase detectors 220 and 258 hold the outputs of VCO 212 and VCO 262 to the same phase, as set by the phase of the signal $f1$ from the crystal oscillator 210. Thus the output of VCO 262 to line 264 is offset from the output frequency $f2$ of VCO 212 by 8.932 KHz, but is frequency coherent.

The output signal from VCO 262 is fed through line 264 to phase modulator 256. The same frequency signal is also fed through buffer 265 to frequency divider 266, and the output of divider 266 that is essentially 2.286878 MHz is fed to the phase modulator 256 to phase modulate the carrier signal of 73.180097 MHz received through line 264. Divider 268 also provides a signal to the phase modulator 256 of 71.4649 KHz that also phase modulates the carrier signal received from VCO 262. The phase modulated output signal of phase modulator 256 is supplied through line 257 as a local oscillator input signal for the data mixer 254.

The input signal from the receiver diode of line 250 is mixed in data mixer 254 with the local oscillator output of line 257 to provide an output carrier frequency of 8.932 KHz that is amplitude modulated by a frequency of 279.12 Hz and 8.722 Hz. The output of the data mixer 254 is amplified in the 8.9 KHz band by IF amplifier 270 which output is fed through line 269 to detector 231 that provides amplitude detection and the three components, namely the 8.932 KHz carrier frequency that is the fine data frequency, the 279.12 Hz intermediate data frequency and the 8.722 Hz coarse data frequency is filtered by fine filter 251, intermediate filter 253 and coarse filter 255 to the respective zero crossing detectors 276, 278 and 282. The zero crossing detectors function to provide output signals for each zero crossing of the input signal or for each half cycle of the input signal, and supplies output pulses to output lines 277, 279 and 281. The automatic gain control amplifier 271 maintains the level substantially constant in the output of the IF amplifier 270.

A portion of the output of the transmitter driver 240 is fed through line 244 to reference mixer 246. Mixer 246 provides an output signal to the zero crossing detector 291 of 8.932 KHz. Thus the zero crossing detector provides output pulses through line 290 of 8.932 KHz for the fine reference signal. Frequency dividers 293 and 295 respectively divide the output of the zero crossing detector 291 to provide intermediate reference signal in line 292 of 279.12 Hz and a coarse reference output signal in line 294 of 8.722 Hz. A fine clock output signal supplied through line 296 has a frequency of 2,048 times the 8.932 KHz frequency. The intermediate clock signal output 298 supplies an output clock signal that is 2,048 times the intermediate reference frequency of 279.12 Hz and the coarse clock signal output in line 300 provides an output signal that is 2,048 times the coarse reference frequency of 8.722 Hz.

It may be understood that output lines 290, 292 and 294 provide output signals with the original phase of the $f1$ signal from the crystal oscillator 210. The output lines 277, 279 and 281 have the phase of the return signals with the distance phase shift and also with any phase shift resulting from internal delays in the circuits. The outputs of lines 296, 298 and 300 provide clock signals to clock the subsequent digital readout and correlating circuit of FIG. 16, which clock signals have a given multiple of the frequencies of the reference signals and the data signals. For example this multiple for the fine clock signal is 2,048 times the fine clock signal frequency of 8.932 KHz.

Figure 16:
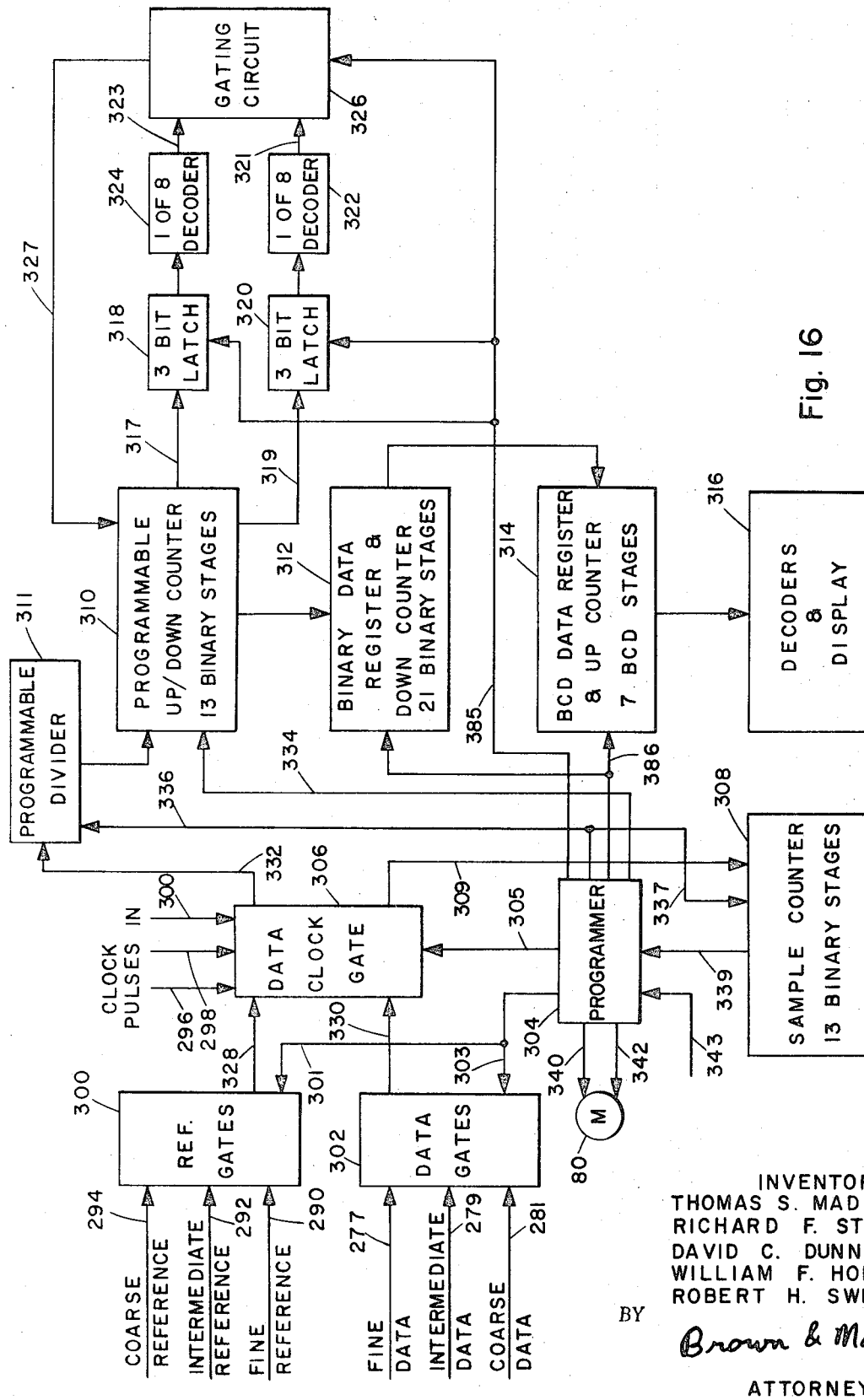
FIG. 16 is a block diagram of the digital readout circuitry.

Referring to FIG. 16, the signals with the original phase are fed through lines 290, 292 and 294 to the reference gate circuit 300. The return signals with the distance phase shift and with the internal delay phase shift is fed through lines 277, 279, and 281 to data gates 302. A programmer 304 of known design that comprises known programming circuits of NAND gates provides cyclic enable pulses for the coarse, intermediate and fine data gates and reference gates for each of the channels 290, 292, 294, 277, 279 and 281. The programmer has three lines output represented by the input lines 301 and 303 to the respective reference gates 300 and data gates 302. The programmer in known cyclic operation provides enable levels through lines 301 and 303 to gate the inputs through lines 328 and 330 respectively to the data clock gate 306. The data clock gate 306 uses known techniques to provide a group of NAND gates and NOR gates that select one of the clocks signals as established by the programmer signal through line 305, which clock signal through one of respective lines 296, 298 or 300 is correlated with the particular input reference signal and data signal gated through reference gates 300 and data gates 302.

As a descriptive example, when the programmer 304, through lines 303 and 301, select the gates of respective circuits 302 and 300 to gate the fine reference signals and the fine data signals through lines 328 and 330 to the data clock gate 306, then the programmer also supplies the particular gate signal through line 305 to gate the clock signals of the fine clock 296 to the data clock gate. The data clock gate 306, functions to open line 332 to an output signal, as follows. With reference to FIG. 17, the fine reference signal 355, having a frequency of 8.932 KHz, opens the gate to line 332 with its leading edge 356. The leading edge 358 of the fine data signal 357, closes the respective data clock gate to line 332. The phase shift 360 between the reference signal 355 and the data signal 357, represents the phase shift of the distance measurement and the internal delay phase shift. During the period of time that line 332 is open, fine clock pulses 362 of a very high frequency which is 2,048 times the fine data and reference frequency of 8.932 KHz is gated to line 332. The fine clock signal is fed through programmable divider 311 and provides pulses to the programmable up down counter 310. With reference again to FIG. 17, it should be understood that pulses 362 of the fine clock are gated to line 332 during any up down portion of the respective reference and data signal 355 and 357 such as at 364 and 366.

The programmer through line 334, programs the counter 310 to either count up or to count down. In this particular illustration, the programmer programs counter 310 to count up. The programmer 304 also supplies a program signal to divider 311 that divides down the count from the data clock gate by a given count, that for example may be 8,192 counts.

For each gated count through line 332, and programmable divider 311, a count is supplied through line 309 to sample counter 308. After a given number of samples are counted, which number of samples counted by the sample counter 308 in this example is 8,192, then a signal is fed by the sample counter 308 through line 339 that advances the programmer to the next clock data lines. Control signals from programmer 304 are fed through lines 336 and 337 to set the divider 311 and sample counter 308 to the particular counts of the fine, intermediate and coarse data. Thus sample counter 308 functions to count the sample groups out of data clock gate 306 through line 309 and when the count is reached, then it advances the programmer 304 to the next clock data line. Since the program divider 311 divides down in the same number as the sample counter 308 counts, this provides an average of the input signal taken that gives better data results and averages out input noise. The use of the trailing edges and leading edges of the reference signal and data signals averages out harmonic noise. Thus the program counter 310, which is a counter and temporary register, counts and registers the fine clock pulses for the given phase shift 360 and this phase shift is represented by the count in the counter 310.

Programmer 304 now sends a signal out through line 342 to the motor 80, see FIG. 5, that controls the position of the optical fiber length 72. This optical fiber length functions as a calibrating coupler in the manner previously described. The output signal through line 342 causes the motor 80 to rotate the calibrating coupler 62 to move the optical fiber length 72 into calibrate position, that is to transmit the light from the transmitting diode 30 to the receiving diode 32. The circuit described in FIGS. 14 and 15 continue to operate in the same manner and provide the same output signals as a distance measuring return signal would provide. However the particular phase shift 360, as illustrated in FIG. 17, would if of smaller duration, be representative of that phase shift caused by internal delay in the circuitry. The system takes its readings in the same manner as before, except the programmer 310 has simultaneously supplied a signal through line 334 that programs the up down counter 304 to count down. Thus during this period of time, counter 310 counts down with a number of counts during the programmed period representative of the internal phase shift delay, which count when removed from the count in the programmable up down counter 310 has removed this phase shift from the detected phase shift providing the actual phase shift delay count of the distance measurement. During this period of time, no signals pass through latches 318 and 320 or to the binary data register 312. However a fine measurement has been taken and a calibration accomplished to remove the internal delay phase shift. The programmer 304 then sends out a signal through line 342 that operates the motor returning the calibrating coupler and its optical fiber length 72 to its original position where it is not in the optical path of the transmitted light.

This same sequence of taking readings and counts from the intermediate data and coarse data is accomplished in the same manner as previously described relative to the fine data to provide successive counts in the programmable up down counter with the calibration removed. It should be understood that the clock signals and thus the sample counts vary between the fine, intermediate and coarse reference signals. For example, in the illustrative embodiment described, the particular counts for the intermediate data is 256 and for the coarse data is 8.

The fine data count that has been stored in the programmable up down counter 310, is supplied to, for example, latch 320 through line 319. Now assuming the intermediate measure has been made and as previously described, the clock counts for the intermediate data phase shift is stored in the programmable up down counter, then the 3 bit data, that is the fifth, sixth and seventh most significant digits of the intermediate data count, is switched through line 317 to the 3 bit latch 318. The intermediate data count is always switched to the particular three bit latch that was not used in first accepting the fine data count.

The outputs of latch circuits 318 and 320 are gated to decoders 322 and 324 by a signal from the programmer 304 through line 385. These decoders of known technique and design have eight output lines for each decoder 322 and 324. One output line on each of the output lines is selected and these outputs are gated through gating network 326 of a known circuit employing known techniques consisting of NAND gates that determine whether to add zero, one or two counts to the intermediate data count in counter 310 to accurately correlate this particular significant digit reading with the data count of the previous fine count data input registered in the counter 310. Gating circuit 326 is gated by a gating signal from programmer 304 through line 385. This provides output pulses representative of zero, one or two counts that is supplied through line 327 to counter 310. These pulses or counts correct the count in the up down counter 310 to correct for phase shift that may be beyond the mid-point of the respective wave forms 355 and 357, which makes it difficult to determine whether the phase shift is leading or lagging the reference signal.

After the pulses for the intermediate data are fed by line 327 to programmable counter 310, then the four most significant bits of this count are gated to register 312 by programmer 304 signal through line 334. At the same time, the three most significant bits of the intermediate data signals and count in counter 310 are gated or loaded into the latch circuit 320, which destroys the previous stored signal of the fine data and replaces it with the stored data of the intermediate data count. Thus the intermediate data is stored in latch 320 to be used later. The intermediate calibration step is processed so that the internal delay phase shift count of that signal stored in the programmable counter 310 is removed prior to the time that the signal is switched into the binary data register 312.

The coarse measure is then made in the manner previously described relative to the intermediate measure and the fine measure, with the signal count stored as described before in the programmable counter 310. The programmable counter in a known manner now gates the fifth, sixth and seventh most significant digits into the 3 bit latch circuit 318 through line 317. The intermediate data count in latch 320 and the coarse data count in latch 318 are again decoded by the programmer 304 in the manner previously described and decoders 322 and 324 and gating circuit 326 again determines whether to add zero, one or two pulses or counts into counter 310 through line 327. It is to be understood that the programmable up down counter 310 is, in the original condition down one count so that zero, one or two counts moves the counter in a range from a down count of one to an up count of one. When the coarse count has been corrected and stored in the programmable counter 310, then the four most significant digits are stored into the binary data register and down counter 312. This places a binary representation of a measured distance, corrected for internal delay phase shift errors, in register 312. The programmer 304 now feeds a count and enable signal through line 386 to register 312 and BCD data register 314. This initiates the binary data register 312 to count down and the BCD data register 314 to count up in binary code decimal, which changes the distance measurement to binary code decimal in register 314. The BCD information is then decoded by decoder 316 with the measurement being displayed in decimal numbers.

An exemplary sequencing of the previously described steps are as follows.

Fine calibrate
Fine measure
Load Latches
Stored data in data register 312
Intermediate measure
Intermediate calibrate
Correct intermediate data count
Store intermediate data count
Coarse calibrate
Coarse measure
Correct coarse data count
Store coarse data count
Convert stored fine, intermediate and coarse data to BCD and display It should be understood that in the digital system employed herein, in the exemplary embodiment, a 32 to 1 ratio between coarse, intermediate and fine data is possible and provides a range that would have to be larger to the degree of being impractical if a decimal system was used.

Having described our invention, we now claim.

1. In an optical distance measuring device,
   a light source,
   transmitter means for sending a continuous light beam from said source toward a light reflecting object whose distance is to be measured,
   first means for generating a carrier frequency,
   second means for frequency modulating said carrier frequency by a sub-carrier frequency,
   means for simultaneously modulating the intensity of said continuous light beam by said carrier frequency and sub-carrier frequency,
   receiver means for receiving and detecting the intensity of said light beam from said reflecting object and providing data output signals,
   means for cross coupling said carrier frequency and sub-carrier frequency from said first and second means to said receiver means,
   means for determining the relative phase shifts of said carrier frequency and said sub-carrier frequency reflected in the changes in intensity of the outgoing and incoming continuous light beam,
   and means for combining the determined phase shift of said carrier frequency and the phase shift of said sub-carrier frequency to indicate the distance.

2. In an optical distance measuring device as claimed in claim 1 including,
   third means for simultaneously frequency modulating said carrier frequency by a second sub-carrier frequency,
   said determining means including means for determining the relative phase shifts of said second sub-carrier frequency of the outgoing and incoming light,
   said cross coupling means cross couples said second sub-carrier frequency,
   and said combining means includes means for combining the phase shift of said second sub-carrier frequency with the phase shifts of said carrier frequency and said sub-carrier frequency to indicate the distance.

3. In an optical distance measuring device as claimed in claim 2 in which,
   said combining means includes a binary digital processing circuit for processing said phase shifts to indicate distance,
   and said carrier frequency and said first and second sub-carrier frequencies are so spaced in frequency range that said digital processing circuit provides fine, intermediate and course distance measuring accuracies.

4. In an optical measuring device as claimed in claim 3 in which,
   said combining means includes means for decoding the output of said binary digital processing circuit to binary code decimal and providing the distance display in decimal numbers.

5. In an optical distance measuring device as claimed in claim 2 in which,
   said first and second and third means includes oscillator means for providing an output frequency,
   second oscillator means being phase and frequency locked to said output frequency for providing said carrier frequency,
   means for dividing said output frequency into said sub-carrier frequency and said second sub-carrier frequency,
   and adder means for simultaneously linerally adding said sub-carrier frequency and said second sub-carrier frequency prior to frequency modulating said carrier frequency.

6. In an optical distance measuring device as claimed in claim 5 in which,
   said determining means includes third oscillator means simultaneously phase and frequency locked to said output frequency for providing a second output frequency, frequency divider means for dividing said second output frequency into two frequencies, modulator means for modulating said second output frequency with said two frequencies, and mixer means for mixing the output of said modulator means and the carrier frequency and sub-carrier frequencies in said data output signals.

7. In an optical distance measuring device as claimed in claim 6 in which, said carrier frequency is a given multiple of said sub-carrier frequency, and said sub-carrier frequency is the same multiple of said second sub-carrier frequency.

8. In an optical distance measuring device as claimed in claim 3 in which, said digital processing circuit includes a binary counter for storing pulses, and gate clock means for providing a group of pulses to said binary counter that correspond in number to the time interval of said phase shifts.

9. In an optical distance measuring device as claimed in claim 8 including, means for opening said gate clock means to pass a given number of groups of said pulses, and divider means for dividing said pulses of said group by said given number.

10. In an optical distance measuring device as claimed in claim 8 including, programmer means for gating said gate clock means serially for said phase shifts of said carrier frequency and said sub-carrier frequency and said second sub-carrier frequency.

11. In an optical distance measuring device as claimed in claim 2 in which, said combining means includes clock gate means for providing groups of pulses having a number of pulses corresponding to the time length of said phase shifts, counter means for counting said pulses, delay portion means for determining that delay portion of said phase shifts resulting from internal circuit delays in said measuring device, said clock gate means translates said delay portion into delay portion pulses, and means for down counting said counter means in response to said delay portion pulses.

12. In an optical distance measuring device as claimed in claim 11 in which, said delay portion means includes light transmission means for directly cross coupling said outgoing light beam to said receiver means.

13. In an optical distance measuring device as claimed in claim 12 in which, said light transmission means comprises an optical fiber link.

14. In an optical distance measuring device as claimed in claim 13 including, means for periodically pivoting said optical fiber link into and out of the light transmission position.

15. In an optical distance measuring device as claimed in claim 14 including, light attenuating means in said optical fiber link for selectively attenuating the light intensity of the light transmitted.

16. In an optical distance measuring device as claimed in claim 15 including, means for adjusting said light attenuating means to set the intensity of the light transmitted to substantially the light intensity of the reflected light beam.

17. In an optical distance measuring device as claimed in claim 21 in which, said light source comprises a light emitting diode, and light converting means for translating the light emitted from said diode as a planar light source.

18. In an optical distance measuring device as claimed in claim 17 in which, said light converting means comprises a relatively short in length light pipe.

19. In an optical distance measuring device as claimed in claim 17 in which, said light converting means comprises a baffle with a pin hole.

20. In an optical distance measuring device as claimed in claim 17 in which, said light converting means comprises a baffle with an aperture and a field lens that integrates the light at the aperture.

* * * * *